United States Patent
Kobayashi et al.

(10) Patent No.: US 10,132,398 B2
(45) Date of Patent: Nov. 20, 2018

(54) STRAIN WAVE GEARING AND METHOD FOR MANUFACTURING MULTI-LAYER HOLLOW BODY

(71) Applicant: HARMONIC DRIVE SYSTEMS INC., Shinagawa-ku, Tokyo (JP)

(72) Inventors: Masaru Kobayashi, Azumino (JP); Yoshihide Kiyosawa, Azumino (JP)

(73) Assignee: Harmonic Drive Systems Inc., Shinagawa-ku, Tokyo (JP)

(*) Notice: Subject to any disclaimer, the term of this patent is extended or adjusted under 35 U.S.C. 154(b) by 267 days.

(21) Appl. No.: 15/126,329

(22) PCT Filed: Mar. 31, 2014

(86) PCT No.: PCT/JP2014/059418
§ 371 (c)(1),
(2) Date: Sep. 15, 2016

(87) PCT Pub. No.: WO2015/151146
PCT Pub. Date: Oct. 8, 2015

(65) Prior Publication Data
US 2017/0082187 A1    Mar. 23, 2017

(51) Int. Cl.
*F16H 35/00* (2006.01)
*F16H 49/00* (2006.01)
*B23P 15/14* (2006.01)
*F16C 33/58* (2006.01)
*F16C 19/06* (2006.01)
*F16C 19/36* (2006.01)

(52) U.S. Cl.
CPC ............ *F16H 49/001* (2013.01); *B23P 15/14* (2013.01); *F16C 33/581* (2013.01); *B23P 2700/12* (2013.01); *F16C 19/06* (2013.01); *F16C 19/362* (2013.01); *F16C 2361/61* (2013.01)

(58) Field of Classification Search
CPC .................................................... F16H 49/001
USPC ........................................................... 74/640
See application file for complete search history.

(56) References Cited

U.S. PATENT DOCUMENTS 4,177,695 A    12/1979  Grove
6,874,231 B2 *  4/2005  Kobayashi ............. B23P 15/14
                                                        29/893.1
(Continued)

FOREIGN PATENT DOCUMENTS

JP    62-37656 A    3/1987
JP    06-050411 A   2/1994
(Continued)

*Primary Examiner* — Ha Dinh Ho
(74) *Attorney, Agent, or Firm* — Buchanan Ingersoll & Rooney PC (57) ABSTRACT

A wave plug of a wave generator of a wave gear device includes: a metallic outer hollow body with an elliptical wave plug outer circumferential surface formed thereon; a metallic inner hollow body with a wave plug inner circumferential surface formed thereon; and an intermediate hollow body sandwiched between the outer hollow body and the inner hollow body. The intermediate hollow body includes CFRP layers. It is possible to implement a light wave plug in which a big hollow portion can be formed while assuring a required rigidity. Using the wave plug makes it possible to implement a light wave gear device which allows jumping to occur at a high load torque and which includes a big hollow portion.

6 Claims, 5 Drawing Sheets

(56) References Cited

U.S. PATENT DOCUMENTS

| | | | | |
|---|---|---|---|---|
| 8,991,282 B2* | 3/2015 | Yajima | ................. | F16H 49/001 74/640 |
| 2002/0174545 A1* | 11/2002 | Kiyosawa | ............. | B23P 15/003 29/898.063 |
| 2002/0174742 A1* | 11/2002 | Kobayashi | .............. | F16C 33/60 74/640 |
| 2006/0000096 A1 | 1/2006 | Kobayashi et al. | | |
| 2007/0214644 A1* | 9/2007 | Kanai | ................. | B23K 20/002 29/893.37 |

FOREIGN PATENT DOCUMENTS

| | | |
|---|---|---|
| JP | 2000-186718 A | 7/2000 |
| JP | 2001-200854 A | 7/2001 |
| JP | 2006-17222 A | 1/2006 |
| JP | 2012-031891 A | 2/2012 |
| JP | 2013-180357 A | 9/2013 |

\* cited by examiner

STRAIN WAVE GEARING AND METHOD FOR MANUFACTURING MULTI-LAYER HOLLOW BODY

TECHNICAL FIELD

The present invention relates to a rigid internally toothed gear and a wave plug of a wave generator in a strain wave gearing. The present invention also pertains to a method for manufacturing a multi-layer hollow body for use in the manufacture of the wave plug and the rigid internally toothed gear.

BACKGROUND ART

In strain wave gearings, a wave generator causes a flexible externally toothed gear to flex into an ellipsoidal shape and partially mesh with a rigid internally toothed gear, and rotation of the wave generator causes the meshing positions between the two gears to move in the circumferential direction. This generates relative rotation between the two gears that is commensurate with the difference in number of teeth between the two gears.

When one of the gears is secured so as not to rotate, the rotation inputted by the wave generator is outputted from the other gear as reduced rotation that is reduced in speed in accordance with the difference in number of teeth between the two gears. The wave generator, which causes the flexible externally toothed gear to flex into an ellipsoidal shape, typically comprises a metal rigid plug comprising an ellipsoidal outer-circumferential shape, and a wave bearing mounted on the ellipsoidal outer-circumferential shape.

Strain wave gearings of a hollow type are known in which a hollow section extends axially through the central portion of the strain wave gearing. In hollow strain wave gearings, a cylindrical wave plug comprising a hollow section that extends through the central portion thereof is used as the wave plug of the wave generator.

There is a demand for increased usage torque and increased hollow diameter in strain wave gearings. In cases where the usage torque is large, tooth-skipping (ratcheting) of the strain wave gearing is a concern when the hollow diameter is increased in size. In particular, in order to form a hollow section having a larger inner diameter in flat and top-hat-shaped strain wave gearings, it is necessary to form a larger hollow section in the wave plug. When a large hollow section is formed in the wave plug, the wall thickness thereof is reduced, and the radial rigidity thereof is reduced. As a result, the load torque at which tooth-skipping occurs between the two gears also decreases. A wave plug having high rigidity even when the cross-section (wall thickness, width) is limited is needed in order to avoid such circumstances.

Ceramics (alumina: 350 GPa, silicon nitride: 320 GPa) and carbon-fiber-reinforced plastics (also referred to below as "CFRP") are known as materials that have a higher longitudinal modulus of elasticity than does the steel (longitudinal modulus of elasticity: 210 GPa) that is typically used as the material of the wave plug.

Carbon-fiber-reinforced plastic has a wide range of longitudinal elasticity coefficients, from 55 to 400 GPa, due to the modulus of elasticity of the carbon fibers used. Patent Document 1 discloses a material in which CFRP is used. In Patent Document 1, it is proposed that a material having a sandwich structure, in which CFRP layers are layered on the obverse and reverse of a vibration-damping plate, be used in a rectangular tubular frame for forming a fork in a robot hand.

PRIOR-ART DOCUMENTS

Patent Documents

Patent Document 1: JP-A 2013-180357

SUMMARY OF THE INVENTION

Problems to be Solved by the Invention

However, ceramics are not suited for use as a material for wave plugs because they are not readily processed. Additionally, although manufacturing a wave plug using the material having a sandwich structure proposed in Patent Document 1 has been considered, the obverse and reverse surfaces of the material are formed by the CFRP layers and are not readily processed.

It is necessary to process the outer-circumferential surface of the wave plug so as to have a highly precise ellipsoidal shape, further necessitating complex processes in order to attach a motor shaft to the inner-circumferential surface of the wave plug and perform other such operations. Therefore, while there is a demand for a wave plug having high rigidity, there is at the same time a demand for the outer- and inner-circumferential surfaces of the wave plug to be readily processed in a highly precise manner. There is no material in the prior art that is suitable as a material for a wave plug that meets both of these demands.

With regard to the rigid internally toothed gear of a strain wave gearing as well, while there is a demand for high rigidity, there is at the same time a demand for internal teeth to be readily processed in a highly precise manner in the inner-circumferential surface. Additionally, there are cases in which the rigid internally toothed gear supports the flexible externally toothed gear on the outer-circumferential surface with a ball bearing or other type of bearing interposed therebetween. In such a case, the inner-race raceway surface of the bearing is formed integrally with the outer-circumferential surface of the rigid internally toothed gear, and the strain wave gearing is configured to be small in size and light-weight as well. Therefore, there is a demand for the rigid internally toothed gear to have high rigidity, and for a bearing raceway surface to be readily processed in a highly precise manner in the outer-circumferential surface thereof.

With the foregoing in view, it is an object of the present invention to provide a strain wave gearing having a wave generator comprising a highly processable wave plug with which it is possible to ensure high rigidity when the cross-section (wall thickness, width) is limited.

An additional object of the present invention is to provide a strain wave gearing in which any reduction in the load torque at which tooth-skipping occurs is minimized, and a large hollow section can be formed.

A further object of the present invention is to provide a strain wave gearing having a rigid internally toothed gear which is readily processed, and with which it is possible to ensure high rigidity when the cross-section is limited.

Moreover, another object of the present invention is to propose a method for manufacturing a multi-layer hollow body for use in the manufacture of such a wave plug and rigid internally toothed gear which are readily processed, and with which it is possible to ensure high rigidity when the cross-section is limited.

Means to Solve the Problems

In order to achieve the above-mentioned objects, a strain wave gearing according to the present invention, characterized by having:
   a rigid internally toothed gear;
   a flexible externally toothed gear; and
   a wave generator for causing the flexible externally toothed gear to flex into an ellipsoidal or other non-circular shape and partially mesh with the rigid internally toothed gear, and causing the meshing positions between the two gears to move in the circumferential direction;
   the wave generator comprising a hollow wave plug of which the plug outer-circumferential surface is formed in an ellipsoidal or other non-circular shape, and a wave bearing mounted on the plug outer-circumferential surface;
   at least one of the rigid internally toothed gear and the wave plug being formed from a multi-layer hollow body;
   the multi-layer hollow body comprising an outer hollow body made of metal, an inner hollow body made of metal, and an intermediate hollow body sandwiched between the outer hollow body and the inner hollow body; and
   the intermediate hollow body comprising at least one layer of carbon-fiber-reinforced plastic.

In the strain wave gearing of the present invention, the wave plug and/or the rigid internally toothed gear is formed from a multi-layer hollow body in which a CFRP layer is sandwiched between the outer hollow body and the inner hollow body. A wave plug or rigid internally toothed gear formed from these materials is lighter in weight, and has higher ensured rigidity when the cross-section (wall thickness and width) is limited, than in the case of a wave plug or rigid internally toothed gear comprising only a metal material. Additionally, the outer-circumferential surface of the multi-layer hollow body is formed by the outer hollow body made of metal, and the inner-circumferential surface of the multi-layer hollow body is formed by the inner hollow body made of metal. Accordingly, the multi-layer hollow body is easily processed in relation to the outer-circumferential portion and inner-circumferential portion, and is suitable for use as a material of a wave plug or rigid internally toothed gear.

In the present invention, when the wave plug is formed from the multi-layer hollow body, the plug outer-circumferential surface is formed on the outer-circumferential surface of the outer hollow body. With this wave plug, it is possible to ensure higher rigidity when the cross-section (wall thickness and width) is limited, and to make the wave plug lighter in weight, than in the case of a wave plug comprising only a metal material. Accordingly, it is possible to implement a light-weight wave plug in which a large hollow section can be formed while ensuring the required rigidity.

Additionally, the outer-circumferential portion of the wave plug is formed from the outer hollow body made of metal, and the inner-circumferential portion of the wave plug is formed from the inner hollow body made of metal. Accordingly, it is easy to precisely process the outer-circumferential surface of the wave plug so as to have an ellipsoidal or otherwise non-circular outer-circumferential surface, and it is also easy to carry out complex processing to attach a motor shaft to the inner-circumferential surface of the wave plug.

In this manner, a wave plug which is readily processed, and with which it is possible to ensure high rigidity when the cross-section is limited, is used in the strain wave gearing of the present invention. Therefore, it is possible to ensure the rigidity of the wave plug even when a large hollow section is formed therein. Accordingly, because the flexible externally toothed gear can be reliably supported by the wave generator, it is possible to minimize any reduction in the load torque at which tooth-skipping occurs, and to implement a light-weight strain wave gearing in which a large hollow section can be formed.

The intermediate hollow body desirably comprises: a first hollow body made of metal; a first carbon-fiber-reinforced plastic layer sandwiched between the outer-circumferential surface of the first hollow body and the inner-circumferential surface of the outer hollow body, and a second carbon-fiber-reinforced plastic layer sandwiched between the inner-circumferential surface of the first hollow body and the outer-circumferential surface of the inner hollow body. Layering a plurality of CFRP layers makes it possible to ensure isotropy in the rigidity and other forms of mechanical strength of the wave plug, as well as to increase the rigidity and reduce the weight of the wave plug.

It is possible to use one material from among steel, stainless steel, aluminum alloys, and titanium alloys as the metal material constituting the outer hollow body, the inner hollow body, and the first hollow body. Each of the hollow bodies can also be manufactured using mutually different metal materials.

The method for manufacturing a multi-layer hollow body for use in a wave plug configured as described above is characterized by including:
   a step for manufacturing a first hollow layered body by layering the second carbon-fiber-reinforced plastic layer on an outer-circumferential surface of an inner-hollow-body blank for forming the inner hollow body;
   a step for manufacturing a second hollow layered body by layering the first carbon-fiber-reinforced plastic layer on an outer-circumferential surface of a first-hollow-body blank for forming the first hollow body;
   a step for manufacturing a third hollow layered body by press-fitting the first hollow layered body into the second hollow layered body, and securing the second carbon-fiber-reinforced plastic layer to an inner-circumferential surface of the first hollow body blank;
   a step for manufacturing a fourth hollow layered body by press-fitting the third hollow layered body into an outer-hollow-body blank for forming the outer hollow body, and securing the first carbon-fiber-reinforced plastic layer to an inner-peripheral surface of the outer-hollow-body blank; and
   a step for post-processing the outer-hollow-body blank of the fourth hollow layered body and/or the inner-hollow-body blank of the fourth hollow layered body.

The rigid internally toothed gear can be formed from a multi-layer hollow body. In this case, internal teeth are formed on the inner-circumferential surface of the inner hollow body of the multi-layer hollow body. There are also cases in which the inner-race raceway surface of a ball bearing or roller bearing is formed on the outer-circumferential surface of the outer hollow body.

In the case of the rigid internally toothed gear being formed from a multi-layer hollow body as well, the intermediate hollow body may comprise a metal first hollow body, a first carbon-fiber-reinforced plastic layer sandwiched between the outer-circumferential surface of the first hollow body and the inner-circumferential surface of the outer hollow body, and a second carbon-fiber-reinforced plastic layer sandwiched between the inner-circumferential surface of the first hollow body and the outer-circumferential surface of the inner hollow body. Additionally, the metal material constituting the outer hollow body, the inner hollow body, and the first hollow body may be any one material from among steel, stainless steel, aluminum alloys, and titanium alloys.

The rigid internally toothed gear of the present invention is formed from a multi-layer hollow body in which an outer cylinder and an inner cylinder sandwiching a CFRP layer are layered. This makes it possible to ensure higher rigidity when the cross-section (wall thickness and width) is limited, and to make the wave plug lighter in weight, than in the case of a rigid internally toothed gear comprising only a metal material. Additionally, the outer-circumferential portion of the rigid internally toothed gear is formed from a metal outer hollow body, and the inner-circumferential portion of the rigid internally toothed gear is formed from a metal inner hollow body. Accordingly, it is easy to precisely process the internal teeth in the inner-circumferential surface. Additionally, it is easy to form the raceway surface of the bearing integrally with the outer-circumferential surface.

The method for manufacturing a multi-layer hollow body for use in the manufacture of a rigid internally toothed gear configured as described above is characterized by including:

a step for manufacturing a first hollow layered body by layering the second carbon-fiber-reinforced plastic layer on an outer-circumferential surface of an inner-hollow-body blank for forming the inner hollow body;

a step for manufacturing a second hollow layered body by layering the first carbon-fiber-reinforced plastic layer on an outer-circumferential surface of a first-hollow-body blank for forming the first hollow body;

a step for manufacturing a third hollow layered body by press-fitting the first hollow layered body into the second hollow layered body, and securing the second carbon-fiber-reinforced plastic layer to an inner-circumferential surface of the first hollow body blank;

a step for manufacturing a fourth hollow layered body by press-fitting the third hollow layered body into an outer-hollow-body blank for forming the outer hollow body, and securing the first carbon-fiber-reinforced plastic layer to an inner-peripheral surface of the outer-hollow-body blank; and a step for processing internal teeth in the inner-circumferential surface of the inner-hollow-body blank of the fourth hollow layered body.

MODE FOR CARRYING OUT THE INVENTION

Figure 1A:
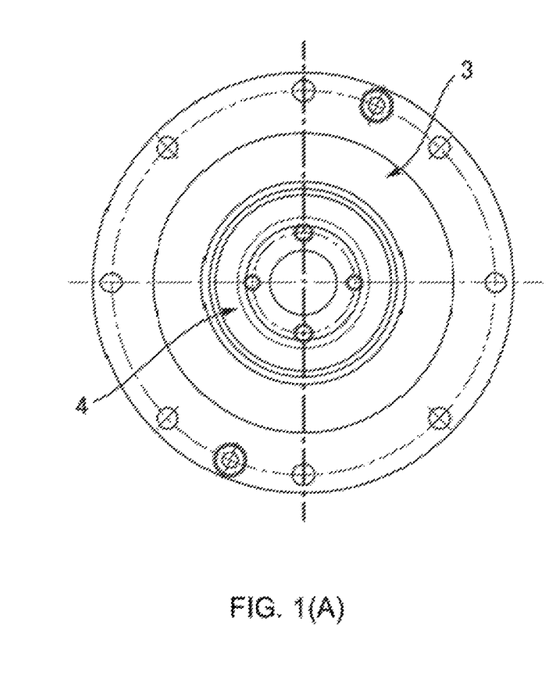
FIGS. 1(A)-1(C) are left-side view, a longitudinal cross-sectional view, and a right-side view of a top-hat-shaped strain wave gearing to which the present invention is applied.
Figure 1B:
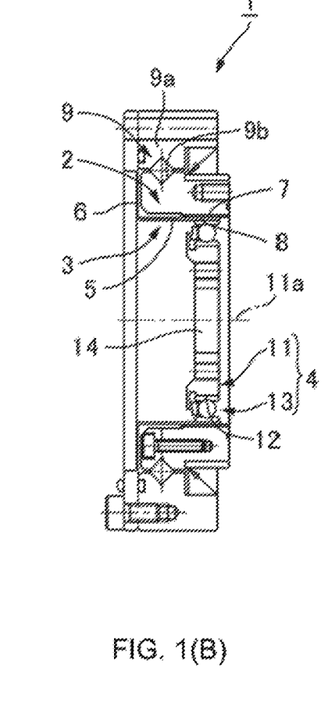
Figure 1C:
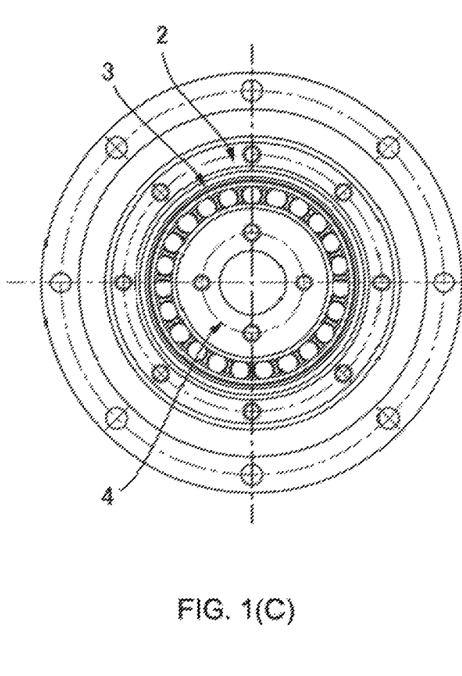

Embodiments of a strain wave gearing to which the present invention is applied are described below with reference to the drawings. FIGS. 1(a), 1(b), and 1(c) are a left-side view, a longitudinal cross-sectional view, and a right-side view, respectively, of a top-hat-shaped strain wave gearing according to the present embodiment.

The strain wave gearing 1 comprises an annular rigid internally toothed gear 2, a top-hat-shaped flexible externally toothed gear 3 arranged coaxially with the rigid internally toothed gear 2, and a wave generator 4 fitted coaxially with the flexible externally toothed gear 3. The flexible externally toothed gear 3 comprises a radially flexible cylindrical barrel part 5, a diaphragm 6 that expands radially outward from one end of the cylindrical barrel part 5, and external teeth 7 formed on the outer-circumferential portion of the other, open-end side of the cylindrical barrel part 5. The rigid internally toothed gear 2 supports the flexible externally toothed gear 3 in a relatively rotatable state with cross roller bearings 9 interposed therebetween. In the present example, the inner-race raceway surface 9a of the cross roller bearings 9 is formed in the circular outer-circumferential surface of the rigid internally toothed gear 2. The flexible externally toothed gear 3 is coaxially fixed to the outer race 9b of the cross roller bearings 9.

The portion of the flexible externally toothed gear 3 in which the external teeth 7 are formed is caused to flex into a non-circular shape, typically an ellipsoidal shape, by the wave generator 4, and the portions having external teeth 7 on the two major-axis ends of the ellipsoid mesh with portions of the rigid internally toothed gear 2 having internal teeth 8. The wave generator 4 is rotationally driven by a motor (not shown). The wave generator 4 comprises a rigid wave plug 11, and a wave bearing 13, which is mounted on the ellipsoidal wave-plug outer-circumferential surface 12 of the wave plug 11 and which is caused to flex into an ellipsoidal shape. A hollow section 14 is formed in the wave plug 11 so as to pass through the center thereof along the direction of the axis 11a.

(Wave Plug)

Figure 2A:
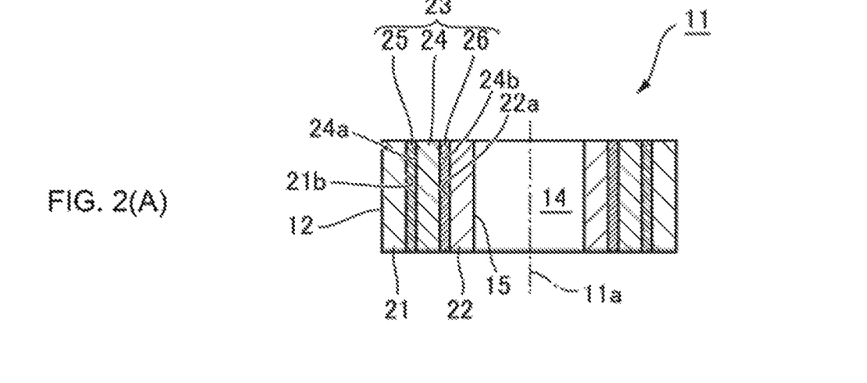
FIGS. 2(A)-2(C) are schematic drawings showing the cross-sectional configuration of the wave plug of the wave generator of the strain wave gearing shown in FIGS. 1(A)-1(C), as well as a schematic drawing showing another example of the wave plug, and a schematic drawing showing yet another example of the wave plug.

FIG. 2(a) is a schematic drawing showing the cross-sectional configuration of the wave plug 11. The wave plug 11 is formed from a multi-layer hollow body that includes a CFRP layer, the wave plug 11 comprising an outer hollow body 21 comprising a metal cylinder in which the ellipsoidal plug outer-circumferential surface 12 is formed, an inner hollow body 22 comprising a metal cylinder in which the wave-plug inner-circumferential surface 15 is formed, and an intermediate hollow body 23 sandwiched between the outer hollow body 21 and the inner hollow body 22.

The intermediate hollow body 23 comprises a first hollow body 24 comprising a metal cylinder, a first carbon-fiber-reinforced plastic layer 25 sandwiched between the outer-circumferential surface 24a of the first hollow body 24 and the inner-circumferential surface 21b of the outer hollow body 21, and a second carbon-fiber-reinforced plastic layer 26 sandwiched between the inner-circumferential surface 24b of the first hollow body 24 and the outer-circumferential surface 22a of the inner hollow body 22.

Steel, stainless steel, an aluminum alloy, a titanium alloy, or the like can be used as the material constituting the outer hollow body 21, the inner hollow body 22, and the first hollow body 24. Carbon steel S45C is typically used. The same material can be used for each of the hollow bodies 21, 22, 24, or mutually different materials can be used therefor. It is also possible to use the same material for the outer hollow body 21 and the inner hollow body 22, and use a different material for the intermediate first hollow body 24.

In the first and second CFRP layers 25, 26, carbon fibers are wound by prepreg sheet winding, or by filament-winding, in which carbon fibers are wound in a prescribed direction and at a prescribed density in a resin parent material. The winding directions can be set to the circumferential direction or to a direction different from the circumferential direction. The winding directions of the first and second CFRP layers can be set to be mutually different.

It is possible to use a high-strength epoxy resin or polyimide resin as the resin used in the first and second CFRP layers 25, 26; an epoxy resin can typically be used. It is also possible to use carbon fibers that are pitch-based or PAN-based as the carbon fibers. From the standpoint of processing properties, elasticity, heat-conductivity, vibration-damping properties, and the like, it is desirable to use pitch-based carbon fibers.

Additionally, the volume Vf of the carbon fibers in the first and second CFRP layers 25, 26 can be set to 55-65% in both the case of filament-winding and the case of sheet-winding. From the standpoint of joint strength between the resin part and the carbon fibers, a Vf of 65% is regarded to be the optimal value.

Furthermore, in order to reduce radial flexing of the annular wave plug 11, it is desirable to increase the circumferential-direction tensile modulus of elasticity thereof. For this purpose, the winding direction of the carbon fibers in the first and second CFRP layers 25, 26 may be set to the circumferential direction (0° orientation). When the CFRP layers are thin; e.g., approximately 1.5 mm or less, merely the 0° orientation will suffice; however, at higher thicknesses, a 45° orientation is desirably combined with the 0° orientation in accordance with the thickness in order for the overall strength to be of at least a prescribed level.

Figure 2B:
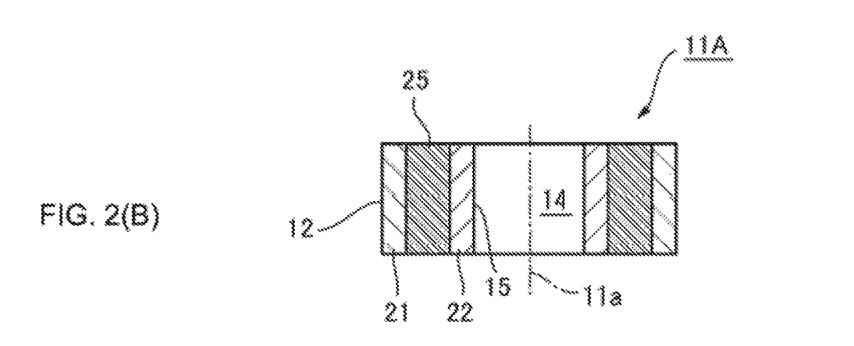

As shown in FIG. 2(b), the intermediate hollow body 23 can be formed from only the first carbon-fiber-reinforced plastic layer 25. In this case, the wave plug 11A is configured from a metal outer hollow body 21 on which the ellipsoidal plug outer-circumferential surface 12 is formed, a metal inner hollow body 22 on which the plug inner-circumferential surface 15 is formed, and a first CFRP layer 25 which serves as an intermediate hollow body 23 sandwiched between the outer hollow body 21 and the inner hollow body 22.

Figure 2C:
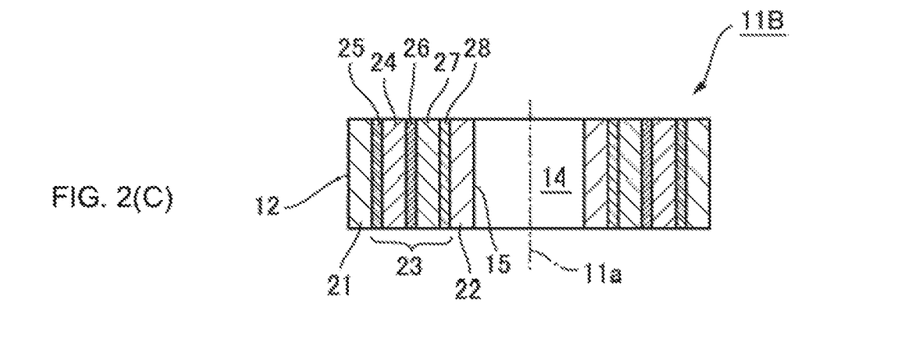

Additionally, as shown in FIG. 2(c), a wave plug 11B configured from the intermediate hollow body 23 can be used. The intermediate hollow body 23 in this case has added thereto, in addition to the first hollow body 24 and first and second CFRP layers 25, 26 shown in FIG. 2(a), an inner second hollow body 27 comprising a metal cylinder and a third CFRP layer 28.

There are known wave generators of strain wave gearings that are equipped with Oldham mechanisms. For example, a wave generator is known that is equipped with an Oldham mechanism having the structure indicated in FIG. 6 of Japanese Patent No. 4155420. In this case as well, the present application can be applied to each of the wave plugs constituting the Oldham mechanism of the wave generator.

(Method for Manufacturing Wave Plug)

Figure 3:
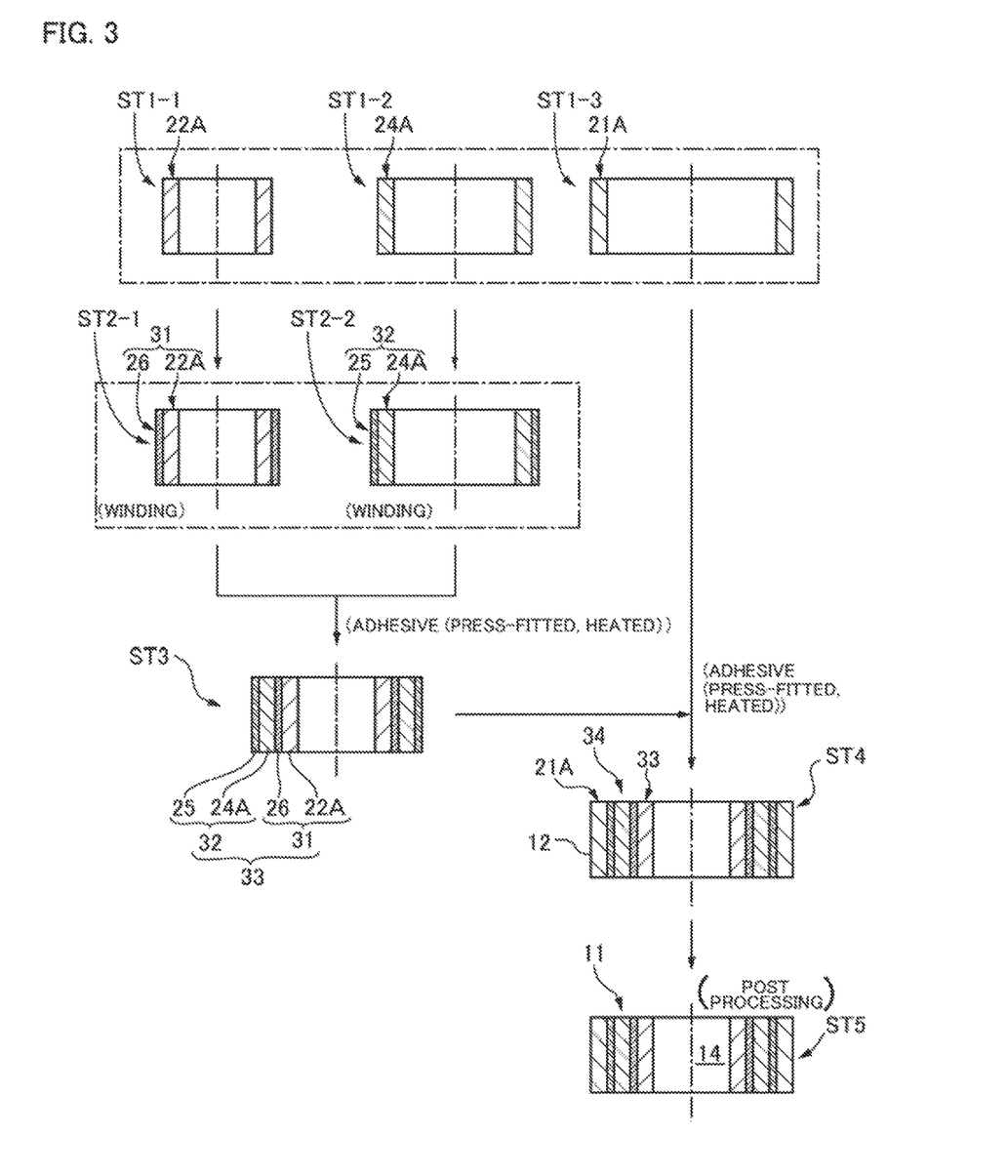
FIG. 3 is an explanatory drawing showing the procedure for manufacturing the wave plug shown in FIGS. 2(A)-2(C)

FIG. 3 is an explanatory drawing showing one example of the method for manufacturing a wave plug 11 having the configuration described above (i.e., a method for manufacturing a multi-layer hollow body). An explanation is given with reference to FIG. 3. First, a cylindrical inner-hollow-body blank 22A for forming the inner hollow body 22, a cylindrical first-hollow-body blank 24A for forming the first hollow body 24, and a cylindrical outer-hollow-body blank 21A for forming the outer hollow body 21 are formed (steps ST1-1, ST1-2, ST1-3). It is also possible to use a blank comprising a metal round bar in lieu of the inner-hollow-body blank 22A.

A first hollow layered body 31, in which the second carbon-fiber-reinforced plastic layer 26 is layered on the circular outer-circumferential surface of the inner-hollow-body blank 22A, is then manufactured (ST2-1). Likewise, a second hollow layered body 32, in which the first carbon-fiber-reinforced plastic layer 25 is layered on the circular outer-circumferential surface of the first-hollow-body blank 24A, is manufactured (ST2-2).

The first hollow layered body 31 is then press-fitted into the circular inner-circumferential surface of the second hollow layered body 32 and heated, and the second CFRP layer 26 and the second hollow layered body 32 are tightly secured together using an adhesive. A third hollow layered body 33 is thereby obtained (step ST3). Thereafter, the third hollow layered body 33 is press-fitted into the circular inner-circumferential surface of the outer-hollow-body blank 21A, and the first CFRP layer 25 and the circular inner-circumferential surface of the outer-hollow-body blank 21A are tightly secured together using an adhesive. A fourth hollow layered body 34 is thereby obtained (step ST4).

Finally, the circular outer-circumferential surface of the outer-hollow-body blank 21A of the fourth hollow layered body 34 is processed to form the ellipsoidally shaped wave-plug outer-circumferential surface 12. Additionally, post-processing is carried out on the inner-hollow-body blank 22A of the fourth hollow layered body 34, bolt holes or the like are formed, and a hollow section 14 of a prescribed diameter is formed (step ST5). Through such steps, the wave plug 11 is manufactured.

(Example of Rigid Internally Toothed Gear)

Figure 4:
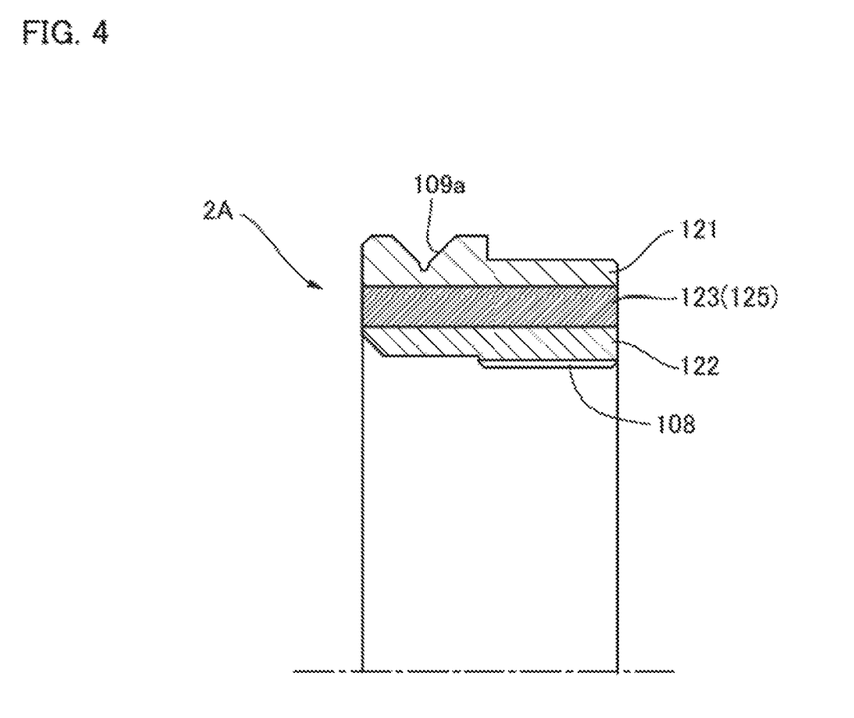
FIG. 4 is a cross-sectional view of an example of a rigid internally toothed gear formed from a multi-layer hollow body.

The rigid internally toothed gear 2 described above can also be manufactured from a multi-layer hollow body comprising a CFRP layer. FIG. 4 is a cross-sectional view of a rigid internally toothed gear 2A formed from a multi-layer hollow body; the rigid internally toothed gear 2A can be used in lieu of the rigid internally toothed gear 2 shown in FIGS. 1(A)-1(C).

The rigid internally toothed gear 2A comprises an outer hollow body 121 comprising a metal cylinder in which the inner-race raceway surface 109a of cross roller bearings (not shown) is formed, an inner hollow body 122 comprising a metal cylinder on which internal teeth 108 are formed, and an intermediate hollow body 123 sandwiched between the outer hollow body 121 and the inner hollow body 122. The intermediate hollow body 123 is formed from a single carbon-fiber-reinforced plastic layer 125.

The material constituting the outer hollow body 121 and inner hollow body 122, and the CFRP layer, can be the same as in the case of the wave plug 11 described previously. Additionally, the intermediate hollow body 123 can also have the multi-layer structure shown in FIGS. 2(a) and 2(c).

It is possible to employ, as the method for manufacturing the multi-layer hollow body comprising CFRP that is used in the manufacture of the rigid internally toothed gear 2A, the same method as that for manufacturing the multi-layer hollow body used in the wave plug shown in FIG. 3. The steps for manufacturing the rigid internally toothed gear 2A include a step for processing internal teeth 108 in the inner-circumferential surface of the manufactured multi-layer hollow body, a step for processing the inner-race raceway surface 109a in the outer-circumferential surface, and the like.

(Other Embodiments)

The rigid internally toothed gear 2A, with which the inner-race raceway surface 109a of the cross roller bearings is integrally formed, is used in the "unit-type" strain wave gearing shown in FIGS. 1(A)-1(C). The present invention can also be applied to rigid internally toothed gears of various structures used in various types of strain wave gearings other than the unit-type strain wave gearing shown in FIGS. 1(A)-1(C).

Figure 5A:
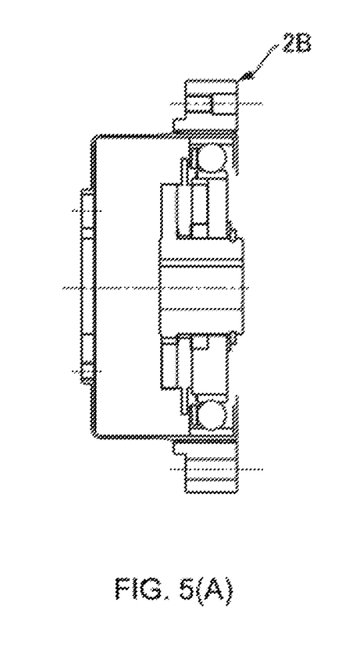
FIGS. 5(A)-5(C) are longitudinal cross-sectional view of three examples of strain wave gearings to which the present invention can be applied.
Figure 5B:
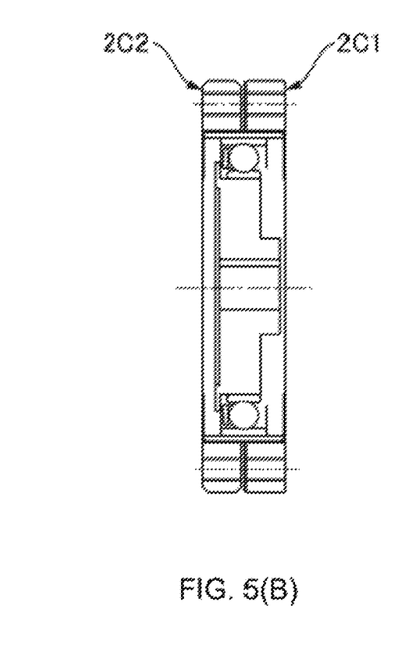
Figure 5C:
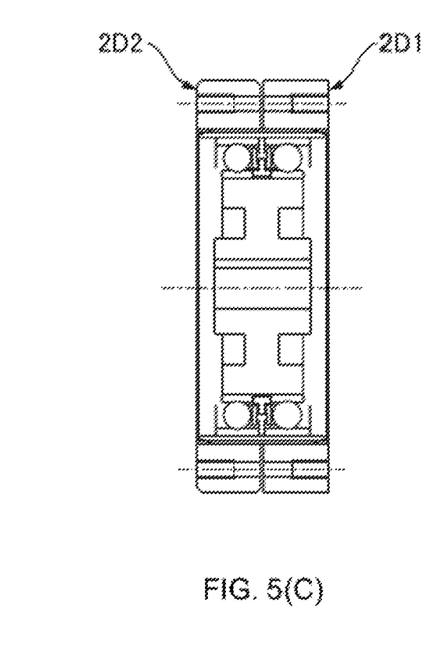

For example, FIG. 5(a) is a longitudinal cross-sectional view of a cup-shaped strain wave gearing, FIG. 5(b) is a longitudinal cross-sectional view of a flat strain wave gearing having a wave generator that comprises single-row ball bearings, and FIG. 5(c) is a longitudinal cross-sectional view of a flat strain wave gearing having a wave generator that comprises double-row ball bearings. The rigid internally toothed gear 2B shown in FIG. 5(a), the two rigid internally toothed gears 2C1, 2C2 shown in FIG. 5(b), and the two rigid internally toothed gears 2D1, 2D2 shown in FIG. 5(c) can be manufactured from a multi-layer hollow body according to the present invention.

The invention claimed is:

1. A strain wave gearing comprising:
   a rigid internally toothed gear;
   a flexible externally toothed gear; and
   a wave generator for causing the flexible externally toothed gear to flex into a non-circular shape and partially mesh with the rigid internally toothed gear, and causing meshing positions between the two gears to move in a circumferential direction, wherein
   the wave generator has a hollow wave plug formed with a plug outer-circumferential surface in a non-circular shape, and a wave bearing mounted on the plug outer-circumferential surface;
   at least one of the rigid internally toothed gear and the wave plug is formed from a multi-layer hollow body;
   the multi-layer hollow body has an outer hollow body made of metal, an inner hollow body made of metal, and an intermediate hollow body sandwiched between the outer hollow body and the inner hollow body; and
   the intermediate hollow body has:
   a first hollow body made of metal;
   a first carbon-fiber-reinforced plastic layer sandwiched between an outer-circumferential surface of the first hollow body and an inner-circumferential surface of the outer hollow body; and
   a second carbon-fiber-reinforced plastic layer sandwiched between an inner-circumferential surface of the first hollow body and an outer-circumferential surface of the inner hollow body.

2. The strain wave gearing according to claim 1, wherein
   the wave plug is formed from the multi-layer hollow body, and
   the plug outer-circumferential surface is formed on an outer-circumferential surface of the outer hollow body.

3. The strain wave gearing according to claim 1, wherein
   the rigid internally toothed gear is formed from the multi-layer hollow body, and
   internal teeth are formed on an inner-circumferential surface of the inner hollow body of the multi-layer hollow body.

4. The strain wave gearing according to claim 1, wherein
   a material constituting the outer hollow body and the inner hollow body is either one of steel, stainless steel, aluminum alloys, and titanium alloys.

5. The strain wave gearing according to claim 1, wherein
   a material constituting the first hollow body is either one of steel, stainless steel, aluminum alloys, and titanium alloys.

6. A method for manufacturing a multi-layer hollow body for use in the wave plug or the rigid internally toothed gear according to claim 1, including:
   a step for manufacturing a first hollow layered body by layering the second carbon-fiber-reinforced plastic layer on an outer-circumferential surface of an inner-hollow-body blank for forming the inner hollow body;
   a step for manufacturing a second hollow layered body by layering the first carbon-fiber-reinforced plastic layer on an outer-circumferential surface of a first-hollow-body blank for forming the first hollow body;
   a step for manufacturing a third hollow layered body by press-fitting the first hollow layered body into the second hollow layered body, and securing the second carbon-fiber-reinforced plastic layer to an inner-circumferential surface of the first hollow body blank;
   a step for manufacturing a fourth hollow layered body by press-fitting the third hollow layered body into an outer-hollow-body blank for forming the outer hollow body, and securing the first carbon-fiber-reinforced plastic layer to an inner-peripheral surface of the outer-hollow-body blank; and
   a step for post-processing the outer-hollow-body blank of the fourth hollow layered body and/or the inner-hollow-body blank of the fourth hollow layered body.

* * * * *